United States Patent [19]
Harris

[11] 3,918,242
[45] Nov. 11, 1975

[54] MATERIAL REMOVAL ATTACHMENT FOR A ROTARY MOWER

[76] Inventor: Edmond H. Harris, 2611 Johnson St., Elkhart, Ind. 46514

[22] Filed: Aug. 14, 1973

[21] Appl. No.: 388,226

Related U.S. Application Data

[63] Continuation of Ser. No. 246,760, April 24, 1972, abandoned.

[52] U.S. Cl. .................. 56/16.7; 56/295; 56/400.2
[51] Int. Cl.² ........................................ A01D 57/12
[58] Field of Search .......... 56/295, 16.7, 16.4, 16.5, 56/400.21, 400.02, 400.2

[56] References Cited
UNITED STATES PATENTS

| | | | |
|---|---|---|---|
| 3,117,633 | 1/1964 | Hosek | 56/295 |
| 3,184,907 | 5/1965 | Harloff | 56/295 |
| 3,321,026 | 5/1967 | Hubbard | 56/295 |
| 3,499,493 | 3/1970 | Hubbard | 56/295 |
| 3,738,092 | 6/1973 | Spear | 56/295 |

FOREIGN PATENTS OR APPLICATIONS
246,184  11/1969  U.S.S.R. .......................... 56/295

Primary Examiner—Russell R. Kinsey
Assistant Examiner—James D. Hamilton
Attorney, Agent, or Firm—Oltsch & Knoblock

[57] ABSTRACT

An attachment for a rotary mower which is securable to the cutter blade drive shaft of the mower in the place of the cutting blade and which includes laterally extending arm parts upon each of which is carried a slide member. Each slide member moves from a retracted position adjacent the rotational axis of the attachment into an extended position at the free end portion of its associated arm upon rotation of the cutter blade drive shaft. A tine or similar material removal device is carried by each slide member and is shiftable from an inoperative to an operative material removal position as the slide member moves into its extended position.

9 Claims, 10 Drawing Figures

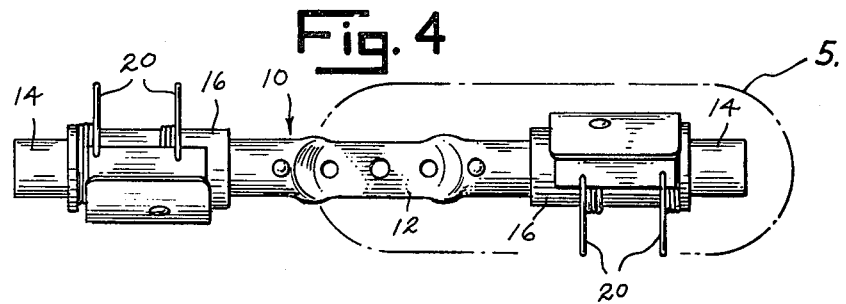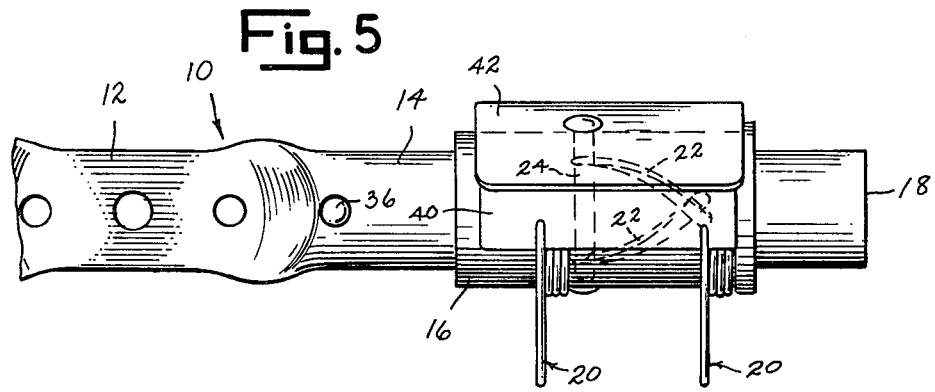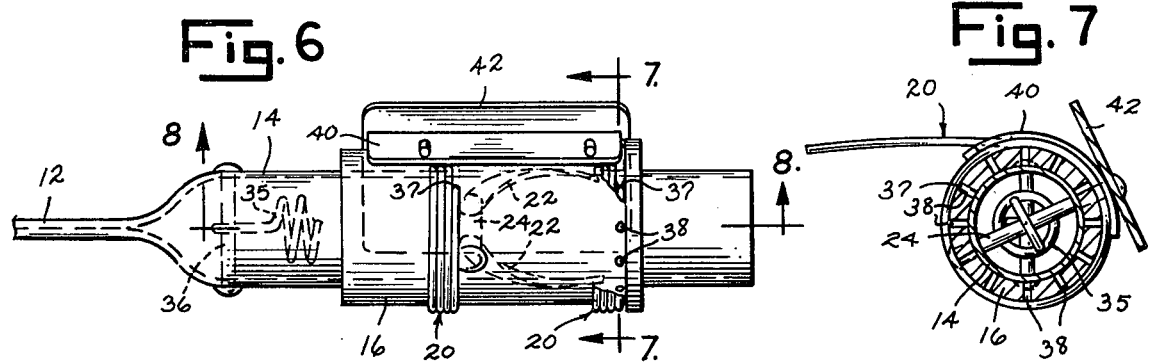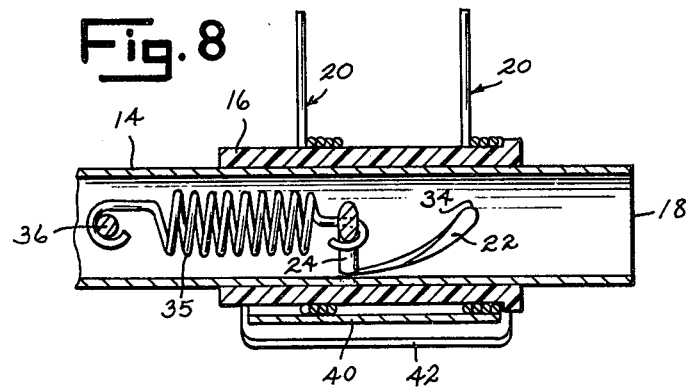

MATERIAL REMOVAL ATTACHMENT FOR A ROTARY MOWER

CROSS REFERENCE TO RELATED APPLICATION

This is a continuation of application Ser. No. 246,760, filed Apr. 24, 1972, now abandoned.

SUMMARY OF THE INVENTION

This invention relates to an attachment for a rotary mower and will have application as a lawn cleaner, leaf removal means, and snow removal means when utilized in association with the mower.

The attachment of this invention is securable to the cutter blade drive means of the mower which rotates about a vertical axis and includes a support member having a connector portion and arm portions which extend outwardly from the connector portion. The connector portion is utilized to secure the support member to the cutter blade drive means for rotation about the vertical rotational axis of the drive means with the arm portions of the support member traveling in a plane perpendicular to such vertical axis.

Slide members are carried by each arm portion of the support member for shiftable movement along the arm portion between a retracted position adjacent the connector portion and an extended position adjacent the free end of the arm portion. Each slide member includes a material removal means which is located in an inoperative position when the slide member is in its retracted position adjacent the connector portion and which is located in an operative position when the slide member is in its extended position adjacent the opposite or free end of the arm portion. When the support member is connected to the cutter blade drive means of the mower and rotated at or above a selected speed, the slide members will be shifted from their retracted into their extended positions causing the material removal means thereof to be shifted from inoperative to operative positions. Biasing means associated with each slide member is provided for urging the slide member back into its retracted position when the cutter blade drive means is reduced in speed, thus causing the material removal means of the slide member to be shifted from its operative into its inoperative position.

In removing the mower cutting blade and securing the attachment device of this invention to the blade drive means, the mower will be converted from a grass or weed cutting device into a device for lawn raking and cleaning, leaf removal, and even snow removal. As the rotary mower traverses the ground, the material removal means carried by the arm portions of the attachment device can each be shifted into an operative material removal position upon actuation of the cutter blade drive means of the mower.

Accordingly, it is an object of this invention to provide an attachment for a rotary mower which converts the mower from a grass cutting device into a lawn cleaning device.

Another object of this invention is to provide an attachment for a rotary mower which converts the mower from a grass cutting device into a leaf removal device.

Another object of this invention is to provide an attachment for a rotary mower which converts the mower from a grass cutting device into a snow removal device.

Still another object of this invention is to provide a lawn raking attachment for a rotary mower which includes material removal parts shiftable into ground engagement upon the obtainment of a selected rotational speed of the cutter blade drive shaft.

Still another object of this invention is to provide a lawn grooming attachment for a rotary mower which allows the mower to be moved over the lawn with the attachment in either an operative or inoperative position depending upon the speed of the cutter blade drive of the mower.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 4 is a top plan view of the attachment device shown in FIG. 2.

FIG. 5 is an enlarged fragmentary view of that portion of the attachment device encircled in FIG. 4.

FIG. 6 is a side view of the attachment device seen in FIG. 5.

FIG. 7 is a cross sectional view taken along line 7—7 of FIG. 6.

FIG. 8 is a longitudinal sectional view taken along line 8—8 of FIG. 6 showing the attachment device in an inoperative position.

DESCRIPTION OF THE PREFERRED EMBODIMENT

Figure 1:
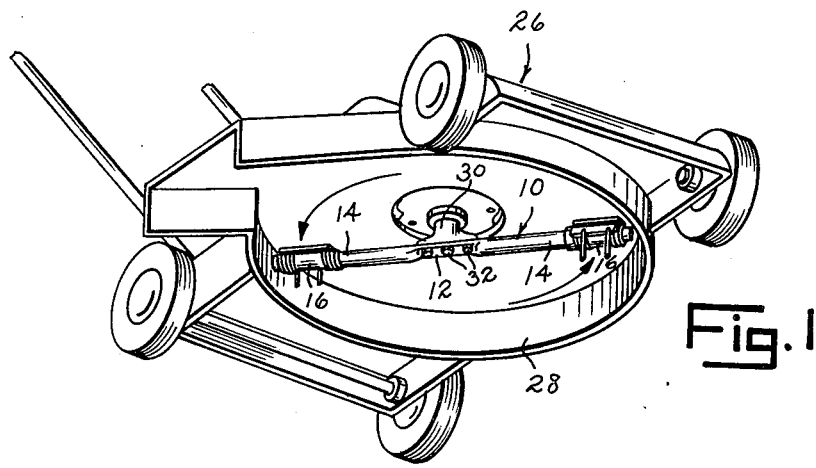
FIG. 1 is a perspective view of a rotary mower as seen from below the mower housing and shown with the illustrated embodiment of this invention secured to the drive shaft for the mower cutter blade.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The attachment device illustrated in the drawings includes a support member 10 having a centrally located connector portion 12 and arm portions 14 which extend laterally outwardly from connector part 12. Arm portions 14 are preferably tubular in configuration and, as shown in the drawings, extend coaxially oppositely from each other. In other embodiments of this invention the arm portions of support member 10 may be three or more in number, extending radially outwardly from connector portion 12 and preferably equi-angularly spaced apart.

A slide member, such as a sleeve 16, encircles each arm portion 14 and is shiftable longitudinally along the arm portion from a retracted position adjacent connector portion 12 to an extended position adjacent the free end 18 of the arm portion. Each sleeve 16 includes one or more material removal parts 20. Material removal parts 20 extend outwardly from sleeves 16 and, in the illustrated embodiment, assume the configuration of tines. Oppositely located aligned helical slots 22 are formed in each arm portion 14. A pin 24 extends through slots 22 in each arm portion 14 and is anchored at its end portions to the sleeve 16 carried by the arm portion. Pin 24 and slots 22 cooperate to form means for limiting and guiding the movement of the sleeve along its arm portion. Each slot 22 extends for approximately one-quarter turn around its sleeve which allows the sleeve to rotate relative to its arm portion 14 approximately 90° as it shifts longitudinally along the arm portion.

Figure 3:
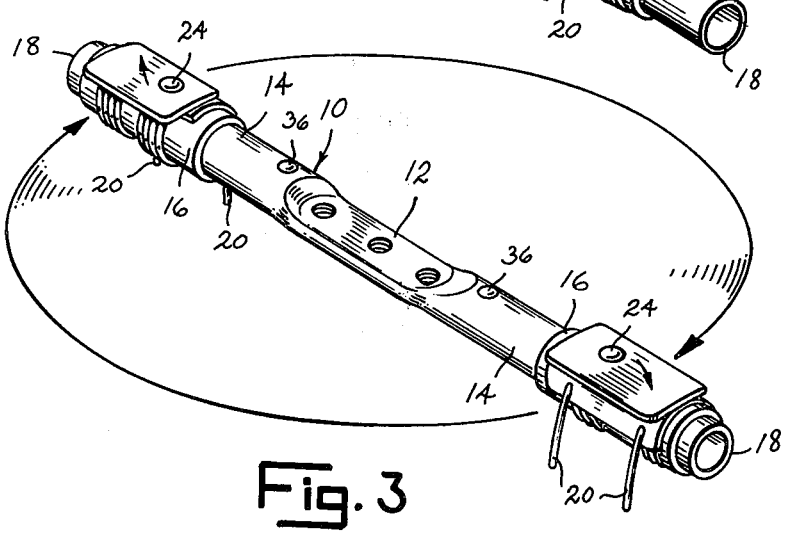
FIG. 3 is a perspective view of the attachment device of FIG. 2 shown in stop-rotary motion in an operative material removal position.
Figure 9:
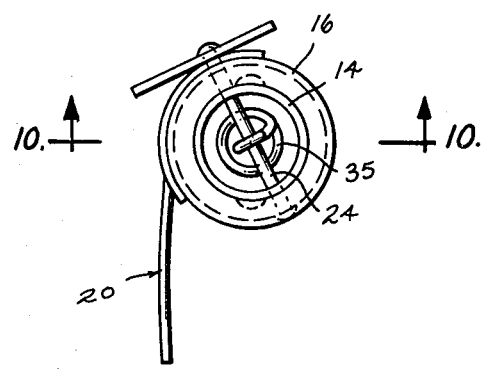
FIG. 9 is an end view of the attachment device shown in an operative position.
Figure 10:
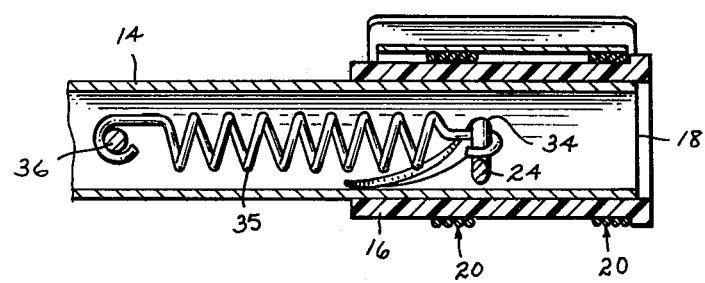
FIG. 10 is a sectional view taken along line 10—10 of FIG. 9.

In FIG. 1, a rotary mower 26 is shown in fragmentary form as viewed from beneath its cutter blade housing 28. The cutter blade for mower 26 has been removed. Support member 10 is connected to cutter blade drive shaft 30, which is powered by either an electric or gasoline motor (not shown), by means of bolts 32 which extend through connector portion 12 and which are turned into shaft 30. The manner of securing support member 10 at its connector portion 12 to the cutter blade drive shaft of the rotary mower can vary depending upon the construction of the mower. Support member 10 is shown in FIGS. 1, 3 and 10 in stop action with sleeves 16 being urged outwardly into their extended positions by centrifugal force during rotation of cutter blade drive shaft 30. Sleeves 16 rotate as they are urged into their extended positions to locate material removal parts 20 in their operative ground-engaging positions. Pins 24 contact the outer ends 34 of slots 22 to prevent the sleeves from being thrown from arm portions 14 as the sleeves are urged outwardly by centrifugal force.

Figure 2:
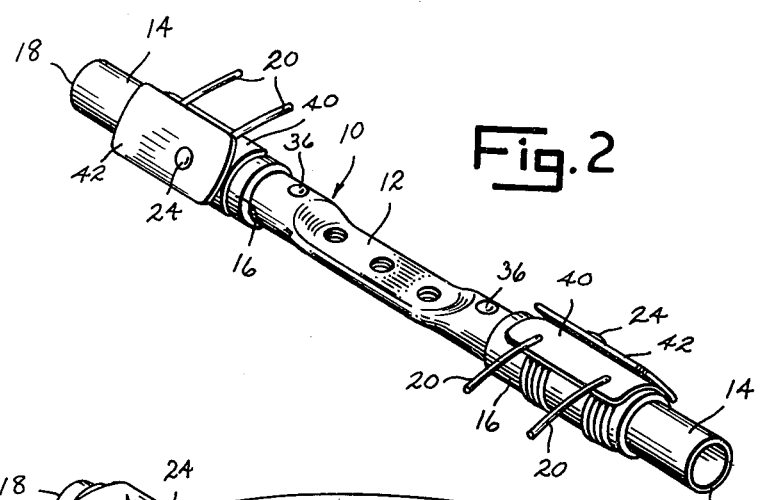
FIG. 2 is a perspective view of the illustrated embodiment of the attachment device of this invention shown disconnected from the mower drive shaft and in an inoperative position.

A helical spring 35 is positioned within each arm portion 14. One end of each spring 35 is connected to pin 24 and the opposite end of the spring is connected to a pin 36 which extends through each arm portion and is anchored to the support member adjacent connector portion 12 thereof. Springs 35 are designed so as to permit sleeves 16 to be shifted by centrifugal force into their extended positions as support member 10 is rotated by cutter blade shaft 30 at or above a selected speed. Once the speed of support member 10 is reduced below such a selected speed, the expanded springs 35 are so designed that their retractive force will overcome the centrifugal force upon the sleeves and cause the sleeves to be urged from their extended into their retracted positions with a resulting pivotal movement of the sleeves about the arm portions which in turn causes the material removal parts 20 of the sleeves to be shifted from their operative downturned positions illustrated in FIGS. 1, 3 and 10 into the inoperative generally horizontal positions illustrated in FIGS. 2 and 6. If the attachment device of this invention is to be utilized upon a rotary mower having a cutter blade drive shaft which can be driven at multiple speeds, the strength of springs 35 will be such that the speed of the shaft must be above idling speed before a sufficient centrifugal force will be applied to sleeves 16 to cause the sleeves to move into their extended positions where material removal parts 20 are brought into ground engagement. For a rotary mower having a one-speed cutter blade drive shaft, springs 35 will be designed so as to permit sleeves 16 to shift into their extended positions upon starting of the mower.

The tines which constitute material removal parts 20 of sleeves 16 are preferably adjustable and formed of coil spring wire. Each part 20 is coiled about a sleeve 16 and has one end 37 turned inwardly so as to protrude into one of a plurality of radially spaced openings 38 formed in the sleeve. The construction and arrangement of each part 20 relative to its sleeve can be best seen in FIGS. 6 and 7. The material removal parts 20 shown in the illustrated embodiment are utilized as a rake for removing matted dead grass and similar material from the lawn. Therefore, the length of each part 20 is such that it will extend to dirt level of the lawn when in its downturned, operative position as the mower 26 is pushed or otherwise propelled across the lawn. When the free ends of the material removal parts 20 become worn and thus shortened, securement end 37 of the part can be pulled from one opening 38 in the sleeve and the part rotated with the free end being pulled outwardly through a hold-down plate 40 which is secured to each sleeve 16, thus lengthening the extended portion of the material removal part. Once the free end of part 20 has been extended to a desired length, end 37 of the material removal part is inserted into another of the sleeve openings 38 to secure the part in position. Hold-down plates 40 through which the free ends of the material removal parts 20 extend are utilized to provide rigidity to the free ends of the material removal parts. It is to be understood that if the attachment device of this invention is to be utilized to remove leaves or snow, material removal parts of different configurations than the thin tines illustrated may be used.

In some constructions of this invention it is preferably to construct sleeves 16 from a material, such as Teflon, having a low coefficient of friction so as to minimize frictional drag between the sleeves and the outer surface of arm portions 14. Additionally, it may be desirable to provide sleeves 16 with a wing 42 to provide a lift or up-draft within mower housing 28 to assist in the discharge of the material removed by the material removal parts 20.

It is to be understood that the invention is not to be limited to the details above described, but may be modified within the scope of the appended claims.

What I claim is:

1. An attachment for a rotary mower traversable over the ground and having cutter blade drive means rotatable about a vertical axis, comprising a support member having a connector means and arm portions each extending laterally outwardly from said connector means and terminating in an end, said connector means for securing said support member to said blade drive means spaced above said ground for rotation about said vertical axis with said arm portions traveling in a plane generally perpendicular to said vertical axis, and slide means carried by each arm portion for shiftable movement along the arm portion between a retracted position adjacent said connector means and an extended position adjacent said end of the arm portion, each slide means being shiftable from its retracted position into its extended position at some speed of rotation of said drive means with said support member secured thereto, each slide means including material removal means shiftable into an inoperative position when said slide means shifts into its retracted position and an operative position when said slide means shifts into its extended position.

2. The attachment of claim 1 and means associated with each slide means yieldable as said slide means moves from its retracted position into its extended position for urging said slide means back into its retracted position at a reduced speed of said drive means with said support member secured thereto.

3. The attachment of claim 2 and means for guiding each slide means rotatably as well as longitudinally along each arm portion as said slide means shifts from its retracted position into its extended position.

4. The attachment of claim 3 wherein said guide means includes stop means for limiting the extent of rotative and longitudinal movement of each slide means along each arm portion.

5. The attachment of claim 2 wherein said arm portions are equally spaced apart.

6. The attachment of claim 5 wherein said arm portions are oppositely positioned.

7. The attachment of claim 2 wherein each arm portion has a cylindrical outer surface and each slide means is a sleeve fitting upon an arm portion and being slidable over said cylindrical surface thereof.

8. The attachment of claim 7 wherein said material removal means includes a tine having one end anchored to a said sleeve and having a free end spaced from said ground when said removal means is in its inoperative position and in contact with said ground when said removal means is in its operative position.

9. The attachment of claim 8 wherein said tine includes an intermediate portion removably coiled about said sleeve, said one end of the tine including means for adjustably and releasably anchoring said tine one end to said sleeve to permit a portion of the tine to be uncoiled from the sleeve to lengthen said free end of the tine.

* * * * *